United States Patent [19]
Wakabayashi et al.

[11] Patent Number: 5,054,099
[45] Date of Patent: Oct. 1, 1991

[54] BINARY IMAGE REDUCTION METHOD

[75] Inventors: Kaoru Wakabayashi, Yokohama; Fumio Adachi; Tadashi Ichikawa, both of Yokosuka, all of Japan

[73] Assignee: Nippon Telegraph & Telephone Corporation, Tokyo, Japan

[21] Appl. No.: 482,660

[22] Filed: Feb. 21, 1990

[30] Foreign Application Priority Data

Feb. 23, 1989 [JP] Japan ................................. 1-41533
May 12, 1989 [JP] Japan ................................. 1-119539

[51] Int. Cl.⁵ .............................................. G06K 9/36
[52] U.S. Cl. ........................................ 382/47; 382/55; 358/451
[58] Field of Search ........................... 382/55, 47, 22; 340/731; 358/451

[56] References Cited

U.S. PATENT DOCUMENTS

| | | | |
|---|---|---|---|
| 4,628,534 | 12/1986 | Marshall | 382/41 |
| 4,893,258 | 1/1990 | Sakuragi | 364/521 |

FOREIGN PATENT DOCUMENTS

| | | | |
|---|---|---|---|
| 0039671 | 3/1982 | Japan | 358/451 |
| 0015359 | 1/1984 | Japan | 350/451 |

Primary Examiner—Leo H. Boudreau
Assistant Examiner—Andrew W. Johns
Attorney, Agent, or Firm—Ladas & Parry

[57] ABSTRACT

A binary image reduction method for reducing a binary original picture at a conversion ratio $\alpha_x$ smaller than 1 in a horizontal direction and at a conversion ratio $\alpha_y$ smaller than 1 in a vertical direction to obtain a converted picture, x satisfying $1/n_x > \alpha_x \geq 1/(n_x+1)$
y satisfying $1/n_y > \alpha_y \geq 1/(n_y+1)$ where $n_x$ and $n_y$ are natural numbers, The method being composed of the steps of:
  obtaining a positional relationship between a target of converted pixels of the converted picture and original pixels on the original picture,
  forming a rectangular area on the original picture having a side of $2(n_x+1)$ original pixels in the horizontal direction and a side of $2(n_y+1)$ original pixels in the vertical direction such that the position of the target of a converted pixel occupies a central position of the rectangular area;
  detecting the presence/absence of a line segment having a predetermined width and a predetermined length in the rectangular area using some or all of $4(n_x+1)$ original pixels in the rectangular area; and
  assigning values of pixels of the line segment as the values of the targets of converted pixels when the line segment is present in the rectangular area and the targets of converted pixels are each the converted pixel closest to the detected line segment.

4 Claims, 30 Drawing Sheets

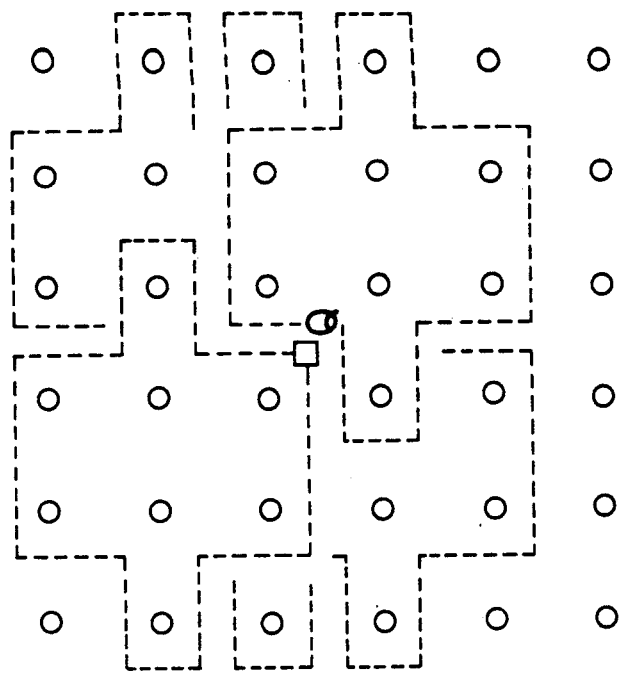
FIG. 8a₂
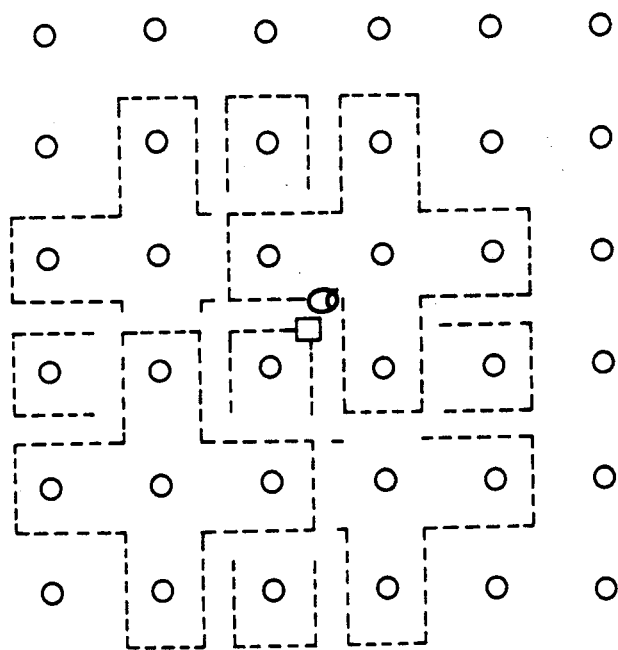
FIG. 8a₁

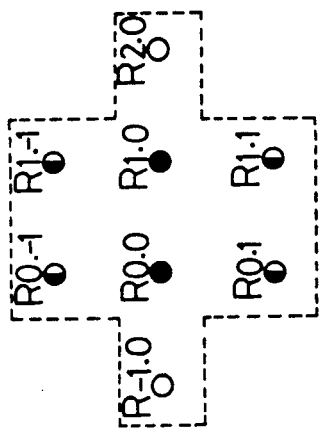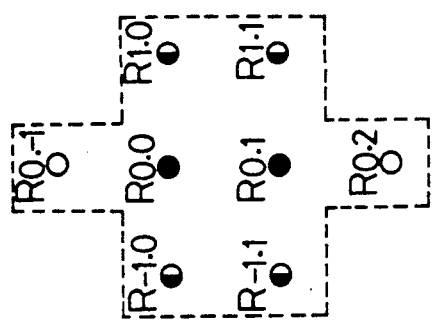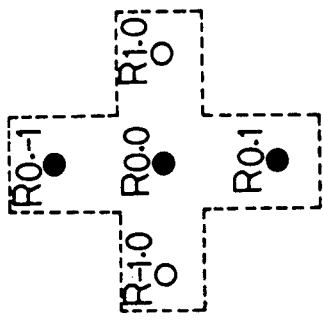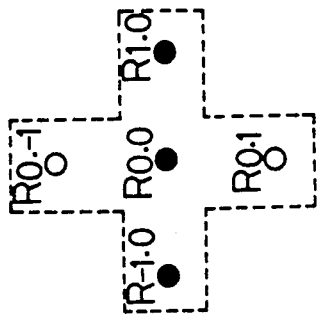

FIG. 9a₁
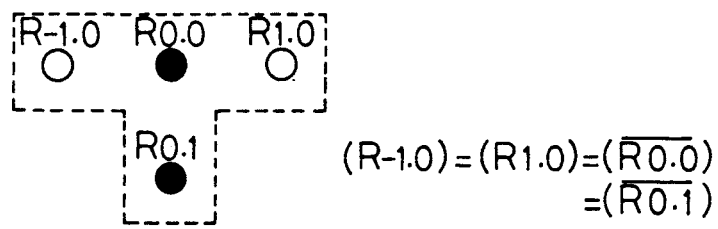
$(R\text{-}1.0) = (R1.0) = (\overline{R0.0})$
$\phantom{(R\text{-}1.0) = (R1.0) } = (\overline{R0.1})$
FIG. 9a₂
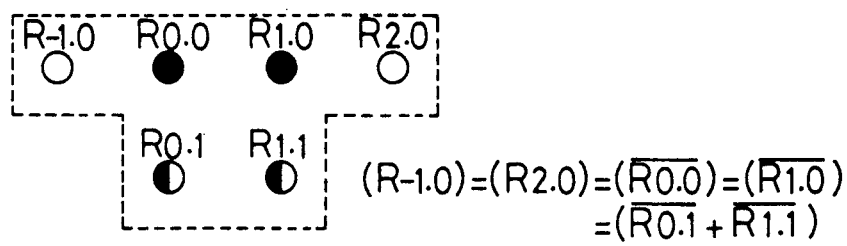
$(R\text{-}1.0) = (R2.0) = (\overline{R0.0}) = (\overline{R1.0})$
$\phantom{(R\text{-}1.0) = (R2.0) } = (\overline{R0.1} + \overline{R1.1})$
FIG. 9a₃
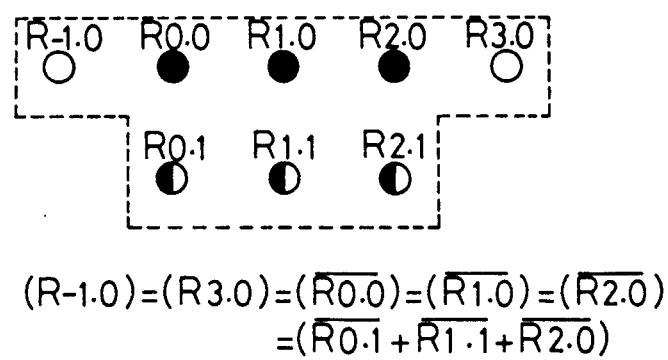
$(R\text{-}1.0) = (R3.0) = (\overline{R0.0}) = (\overline{R1.0}) = (\overline{R2.0})$
$\phantom{(R\text{-}1.0) = (R3.0) } = (\overline{R0.1} + \overline{R1.1} + \overline{R2.0})$

FIG. 9 b₁
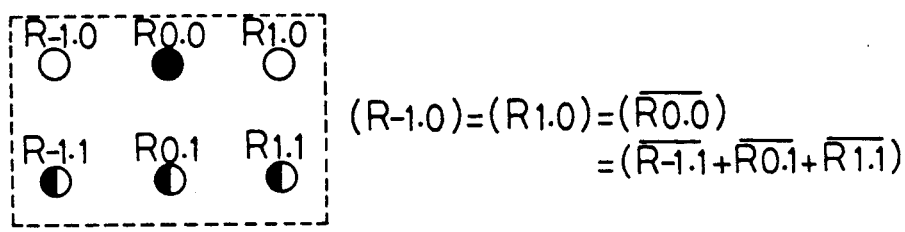
$(R-1.0) = (R1.0) = (\overline{R0.0})$
$\phantom{(R-1.0) = (R1.0)} = (\overline{R-1.1} + \overline{R0.1} + \overline{R1.1})$
FIG. 9 b₂
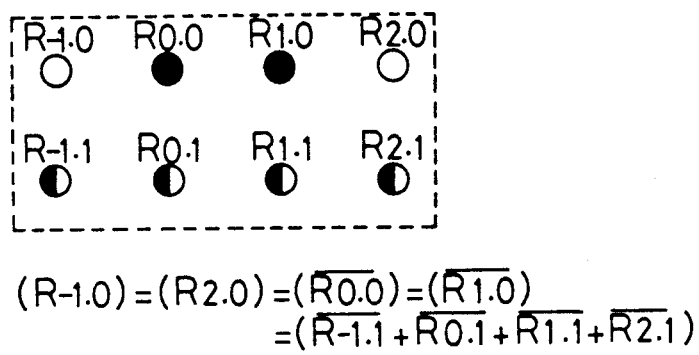
$(R-1.0) = (R2.0) = (\overline{R0.0}) = (\overline{R1.0})$
$\phantom{(R-1.0) = (R2.0)} = (\overline{R-1.1} + \overline{R0.1} + \overline{R1.1} + \overline{R2.1})$
FIG. 9 b₃
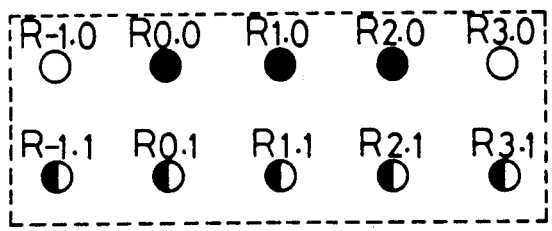
$(R-1.0) = (R3.0) = (\overline{R0.0}) = (\overline{R1.0}) = (\overline{R2.0})$
$\phantom{(R-1.0) = (R3.0)} = (\overline{R-1.1} + \overline{R0.1} + \overline{R1.1} + \overline{R2.1} + \overline{R3.1})$

FIG. 9c₁

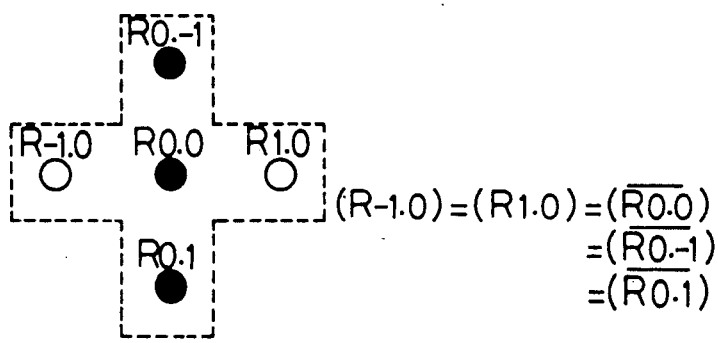

$$(R\text{-}1.0) = (R1.0) = (\overline{R0.0})$$
$$= (\overline{R0.\text{-}1})$$
$$= (\overline{R0.1})$$

FIG. 9c₂

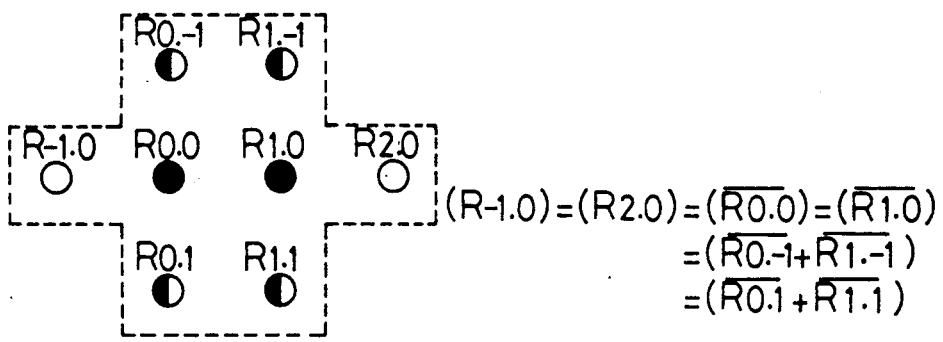

$$(R\text{-}1.0) = (R2.0) = (\overline{R0.0}) = (\overline{R1.0})$$
$$= (\overline{R0.\text{-}1} + \overline{R1.\text{-}1})$$
$$= (\overline{R0.1} + \overline{R1.1})$$

FIG. 9c₃

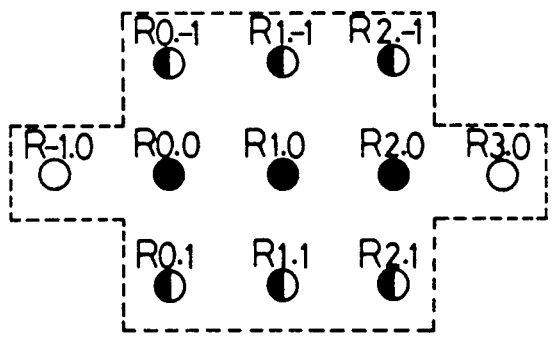

$$(R\text{-}1.0) = (R3.0) = (\overline{R0.0}) = (\overline{R1.0}) = (\overline{R2.0})$$
$$= (\overline{R0.\text{-}1} + \overline{R1.\text{-}1} + \overline{R2.\text{-}1})$$
$$= (\overline{R0.1} + \overline{R1.1} + \overline{R2.1})$$

FIG. 9d₁
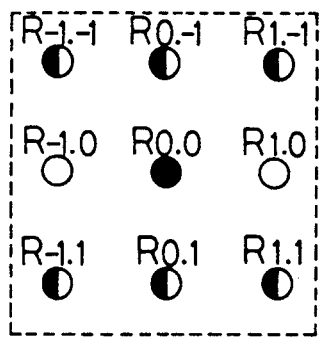
$(R_{-1,0}) = (R_{1,0}) = (\overline{R_{0,0}})$
$= (\overline{R_{-1,-1} + R_{0,-1} + R_{1,-1}})$
$= (\overline{R_{-1,1} + R_{0,1} + R_{1,1}})$
FIG. 9d₂
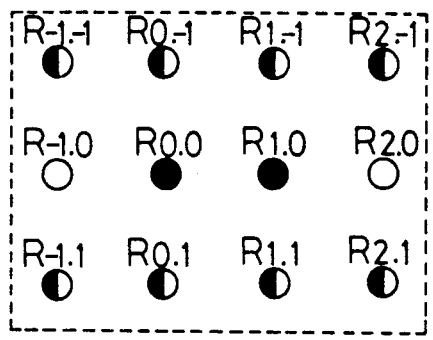
$(R_{-1,0}) = (R_{2,0}) = (\overline{R_{0,0}}) = (\overline{R_{1,0}})$
$= (\overline{R_{-1,-1} + R_{0,-1} + R_{1,-1} + R_{2,-1}})$
$= (\overline{R_{-1,1} + R_{0,1} + R_{1,1} + R_{2,1}})$
FIG. 9d₃
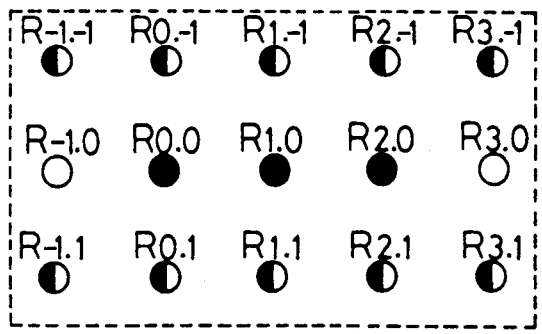
$(R_{-1,0}) = (R_{3,0}) = (\overline{R_{0,0}}) = (\overline{R_{1,0}}) = (\overline{R_{2,0}})$
$= (\overline{R_{-1,-1} + R_{0,-1} + R_{1,-1} + R_{2,-1} + R_{3,-1}})$
$= (\overline{R_{-1,1} + R_{0,1} + R_{1,1} + R_{2,1} + R_{3,1}})$

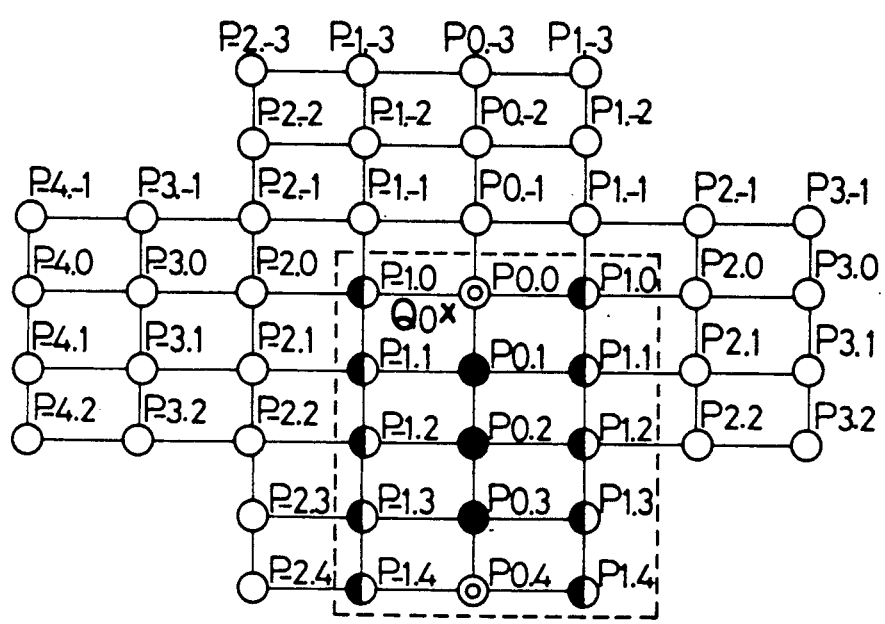
FIG. 12ℓ

BINARY IMAGE REDUCTION METHOD

BACKGROUND OF THE INVENTION

1. Field of the Invention

The present invention relates to a binary image reduction method which is free from degradation of image quality of an image expressed by black and white, i.e., binary values and, more particularly, to a binary image reduction method which can prevent thin lines from being lost so that an uneven thin line generated when an image is read by an image reading apparatus such as a facsimile can be prevented from being disconnected.

2. Description of the Prior Art

As a conventional binary image reduction method, an SPC (Selective Processing Conversion) method shown in FIG. 1(a), a field mapping method shown in FIG. 1(b), and the like are known.

In the SPC method, when a converted picture is mapped to an original image, a value of a pixel of the original picture (to be referred to as an original pixel hereinafter) at a position closest to a pixel of the converted picture to be obtained (to be referred to as a converted pixel hereinafter) is, assigned to the converted pixel. In FIG. 1(a), the value of an original pixel $P_{0.0}$ is assigned to converted pixel Q. In the field mapping method in FIG. 1(b), four original pixels near a converted pixel are selected, an average density which is assigned to the converted pixel position by these four original pixels is calculated, and the calculated density is subjected to threshold value processing to be converted to the value of the converted pixel. In FIG. 1(b), the value of a converted pixel Q is obtained based on four original pixels $P_{0.0}$, $P_{0.1}$, $P_{1.0}$, and $P_{1.1}$.

However, in the above-mentioned reduction methods, when a black or white thin line is present on an original picture, if the thin line on the original picture is not an original pixel closest to the converted pixel position in the SPC method or if the result of the threshold value processing of the average density of the by four associated original pixels does not coincide with the value of the thin line in the field mapping method, the corresponding thin line is lost from the converted picture, resulting in problems of skipping and batter. The "skipping" occurs when a black thin line of an original picture is lost from the converted picture, and the "batter" occurs when a white thin line is lost. In FIGS. 1(a) and 1(b), the value of the converted pixel Q indicates white, and a black thin line ($P_{1.0}$, $P_{1.1}$) of an original picture is lost.

As a method of preventing skipping or batter caused by a lost thin line, an improved TP (Thin Line Preservation) method (Japanese Patent Application No. 62-236087, Sept. 22, 1987) has been proposed. In the TP method, a thin line on an original picture is detected, and the detected thin line is preserved on the converted picture, thus preventing skipping or batter. FIG. 2 shows the basic principle of thin line preservation. In FIG. 2, reference symbols $P_{0.0}$, $P_{0.1}$, $P_{1.0}$, $P_{1.1}$, $P_{2.0}$, and $P_{2.1}$ denote original pixels; and Q, a converted pixel. Assuming that ($P_{m.m}$) represents a value of the original pixel, ($\overline{P_{m.m}}$) represents an inverse value of ($P_{m.m}$), and (Q) represents a value of the converted pixel, if ($P_{0.0}$)=($\overline{P_{2.0}}$)=($P_{1.0}$), these pixels are detected as a thin line, and (Q)=($P_{1.0}$) is set.

When the TP method is applied to a reduction ratio of ⅓, a thin line is determined using original pixel references shown in FIG. 3. More specifically, six original pixels in each of the horizontal and vertical directions (i.e., forming a cross shape) are referred to have an original pixel closest to a target of converted pixels as a central pixel. Thin line determination conditions in FIG. 3 are as follows. That is when one of ($P_{0.0}$)=($\overline{P_{-2.0}}$)=($P_{-1.0}$), ($P_{0.0}$)=($\overline{P_{2.0}}$)=($P_{1.0}$), and ($P_{0.0}$)=($\overline{P_{3.0}}$)=($P_{1.0}$)=($P_{2.0}$) is established, the presence of a vertical thin line is determined. When one of ($P_{0.0}$)=($\overline{P_{0.-2}}$)=($P_{0.-1}$), ($P_{0.0}$)=($\overline{P_{0.2}}$)=($P_{0.1}$), and ($P_{0.0}$)=($\overline{P_{0.3}}$)=($P_{0.1}$)=($P_{0.2}$) is established, the presence of a horizontal thin line is determined. However, an image read from a scanner such as a facsimile apparatus often has an uneven pattern. In the TP method, if the thin line includes the uneven pattern, this pattern is recognized as a thin line in an opposite color and is preserved, resulting in loss of the thin line. FIGS. 4(a) and 4(b) show a case wherein since an original picture includes an uneven pattern at a reduction ratio of ⅓, an original thin line is disconnected on the converted picture. More specifically, since the thin line determination condition of ($P_{0.0}$)=($\overline{P_{2.0}}$)=($P_{1.0}$) is established, it is determined that a vertical white thin line is present at the position of an original pixel $P_{1.0}$, and the value of a converted pixel Q in FIG. 4(a) is set to be a white value. As the result, a converted picture becomes as shown in FIG. 4(b).

Therefore, the present invention relates to binary image reduction in a facsimile apparatus or the like and has as its object to provide a binary image reduction method which can reduce an image including an uneven pattern read from a scanner without being skipped or battered, and can reduce the image with high quality even if the reduction ratio is as small as, e.g., ¼.

SUMMARY OF THE INVENTION

According to the present invention, there is provided a binary image reduction method, wherein when horizontal and vertical conversion ratios $\alpha_x$ and $\alpha_y$ are respectively given by:

$1/n_x > \alpha_x \geq 1/(n_x+1)$ $1/n_y > \alpha_y \geq 1/(n_y+1)$ (where $n_x$ and $n_y$ are natural numbers) some or all of $2(n_x-1)\times 2(n_y+1)$ original pixels are referred in horizontal and vertical directions to have a converted pixel as a central pixel to detect a thin line whose horizontal line width in an original picture is equal to or smaller than $n_x$ pixels and whose vertical line width in the original picture is equal to or smaller than $n_y$ pixels, and which has a length equal to or larger than a predetermined value in horizontal, vertical, and oblique directions, and a value of the thin line is assigned to a converted pixel closest to the thin line upon detection of the thin line.

The binary image reduction method of the present invention is as described above, and mainly includes four processing steps.

(1) Step of determining the positional relationship between a converted pixel and original pixels (2) Step of reading original pixel references Some or all of $2(n_x+1)\times 2(n_y+1)$ original pixels are read out in the horizontal and vertical directions to have a target of converted pixels as a central pixel.

(3) Step of determining a thin line

A thin line is determined in the following two steps:

(i) Detection of a thin line having a predetermined width

Connected pixels which are vertical/oblique connected pixels having a horizontal width of $n_x$ pixels or less and/or are horizontal/oblique connected pixels having a vertical width of $n_y$ pixels or less, and the closest converted pixel of which is a target of converted pixels are detected from the read original pixels.

(ii) Determination of the length of a thin line

It is determined if the detected thin line has a predetermined length.

(4) Step of determining a converted pixel

When a condition in step (3) is satisfied, the value of the thin line is substituted in the target of converted pixels; when it is not satisfied, a value determined by another method (e.g., the value of the closest original pixel) is substituted in the target of converted pixels.

A difference in characteristic feature between the reduction method of the present invention and the conventional reduction method is that, in the present invention, the length of the thin line is detected so as not to erroneously detect an uneven pattern as a thin line, and a means for referring to original pixels having a size described in step (2) is used to allow detection of the length of the thin line.

As a result, according to the binary image reduction method of the present invention, even if a thin line includes an uneven pattern, the thin line can be prevented from being lost, and a converted picture free from degradation can be obtained. In addition, a thin line in a horizontal, vertical, or oblique direction can be prevented from being lost, and a satisfactorily converted picture can be obtained.

Therefore, even if a small character is reduced, the reduced character can be read, and a character smaller by 30% than the smallest character which can be reduced in a conventional method can be reduced.

BRIEF DESCRIPTION OF THE DRAWINGS

FIGS. 1(a) and 1(b) show conventional binary image reduction methods, in which FIG. 1(a) shows an SPC (Selective Processing Conversion) Method, and FIG. 1(b) shows a field mapping method;

FIGS. 8($a_1$) to 8($a_2$) and 8($b_1$) to 8($b_4$) show a detailed execution method of thin line detection according to the present invention;

FIGS. 9($a_1$) to 9($d_3$) show thin line detection conditions used in the present invention;

FIGS. 10(a) to 12(l) show positions of thin lines detection on original pictures according to the present invention, in which FIGS. 10(a) to 10(h) show detection positions of orthogonal/oblique thin lines having a line width of one pixel and a line length of three pixels when a conversion ratio $\alpha$ satisfies $1/1 > \alpha \geq \frac{1}{2}$, FIGS. 12(a) to 12(l) show detection positions of orthogonal/oblique thin lines having line widths of one, two, and three pixels and a line length of three pixels when a conversion ratio $\alpha$ satisfies $\frac{1}{3} > \alpha \geq \frac{1}{4}$;

DETAILED DESCRIPTION OF THE PREFERRED EMBODIMENTS

The present invention will be described in detail hereinafter with reference to the accompanying drawings.

Figure 1A:
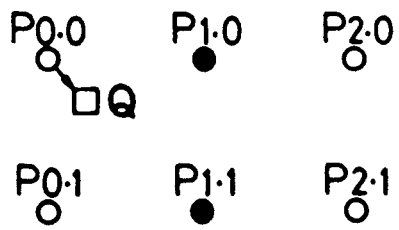
Figure 1B:
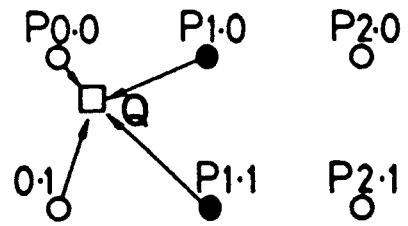
Figure 2:
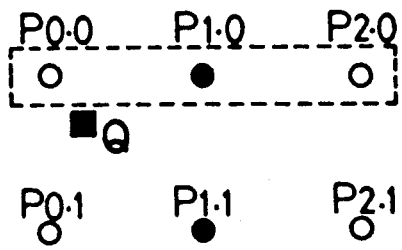
FIG. 2 shows the basic principle of thin line preservation in a conventional reduction method.
Figure 3:
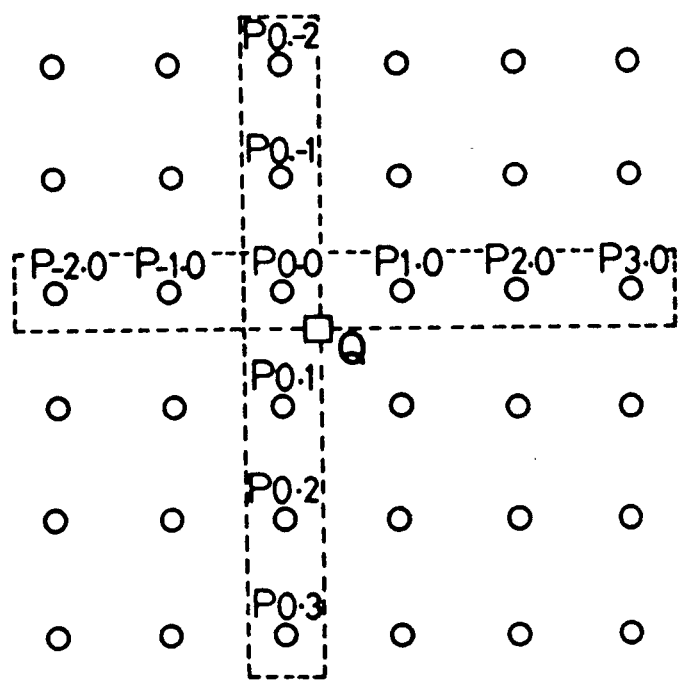
FIG. 3 shows original pixel references in a TP (Thin Line Preservation) method as one conventional reduction method.
Figure 4:
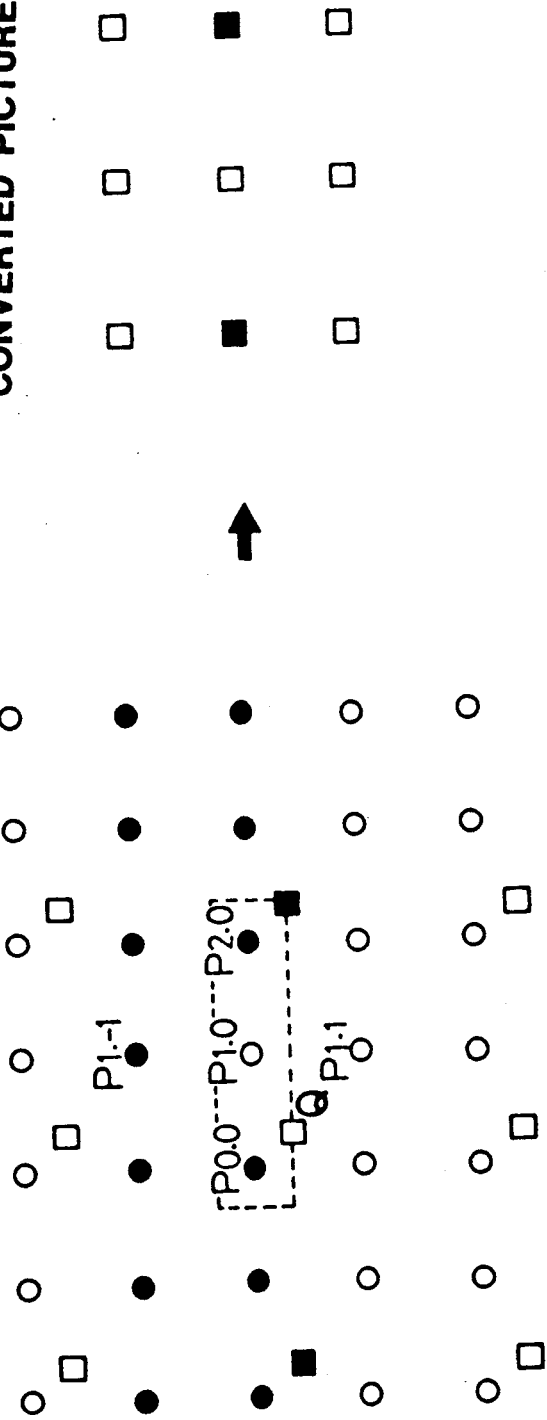
FIGS. 4(a) and 4(b) are views for demonstrating that when an original picture includes an uneven pattern, the conventional TP method erroneously detects the uneven pattern as a thin line upon formation of a converted picture.
Figure 5:
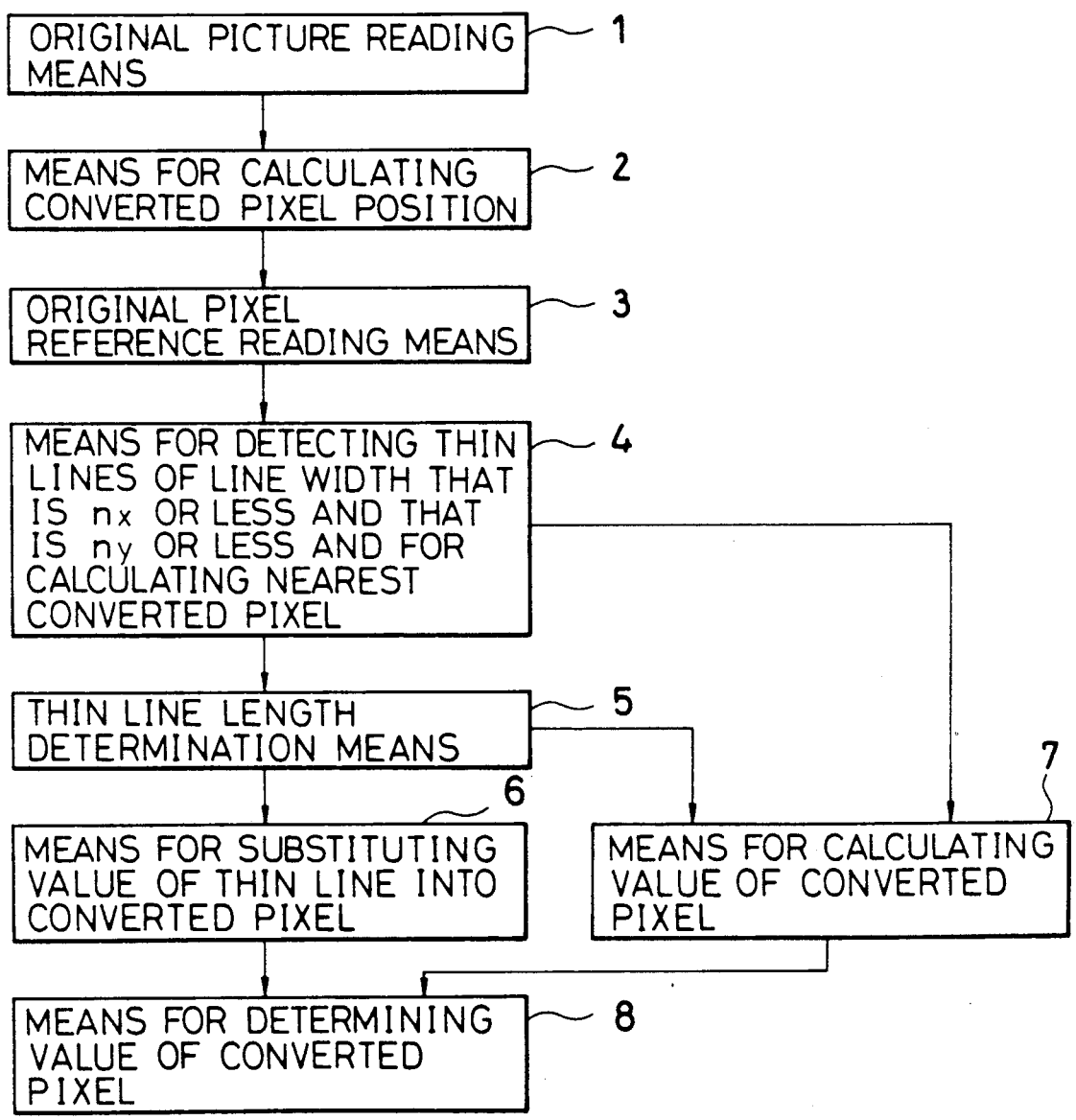
FIG. 5 is a block diagram showing a binary image reduction function according to an embodiment of the present invention.

FIG. 5 is a function block diagram of an embodiment of the present invention. In FIG. 5, reference numeral 1 denotes an original picture reading means for reading out an original picture from a memory or the like; and 2, a converted pixel position calculating means for obtaining the positional relationship between converted pixels and original pixels when a converted picture is mapped to an original picture. The calculating means 2 determines the positional relationship between converted pixels and original pixels on the basis of a conversion ratio. Reference numeral 3 denotes an original pixel reference reading means for reading out values of $2(n_x+1)$ (horizontal direction) $\times 2(n_y+1)$ (vertical direction) original pixels to have a target of converted pixels as a central pixel; 4, a means for detecting a vertical/oblique thin line having a line width of $n_x$ pixels or less and a horizontal/oblique thin line having a line width of $n_y$ pixels or less from the values of the original pixel reference read out by the original pixel reference reading means 3, and for obtaining a converted pixel closest to the detected thin line; 5, a thin line length determination means for determining whether or not a thin line has a predetermined length; 6, a means for, when a target of converted pixels is a converted pixel closest to a thin line and the thin line has the predetermined length, substituting the value of the thin line in the converted pixel; 7, a means for, when no thin line is detected, or when the detected thin line has a length shorter than the predetermined length, or when a converted pixel closest to the thin line is not a target of converted pixels, calculating a value of a converted pixel; and 8, a means for determining a value of a converted pixel.

Figure 6:
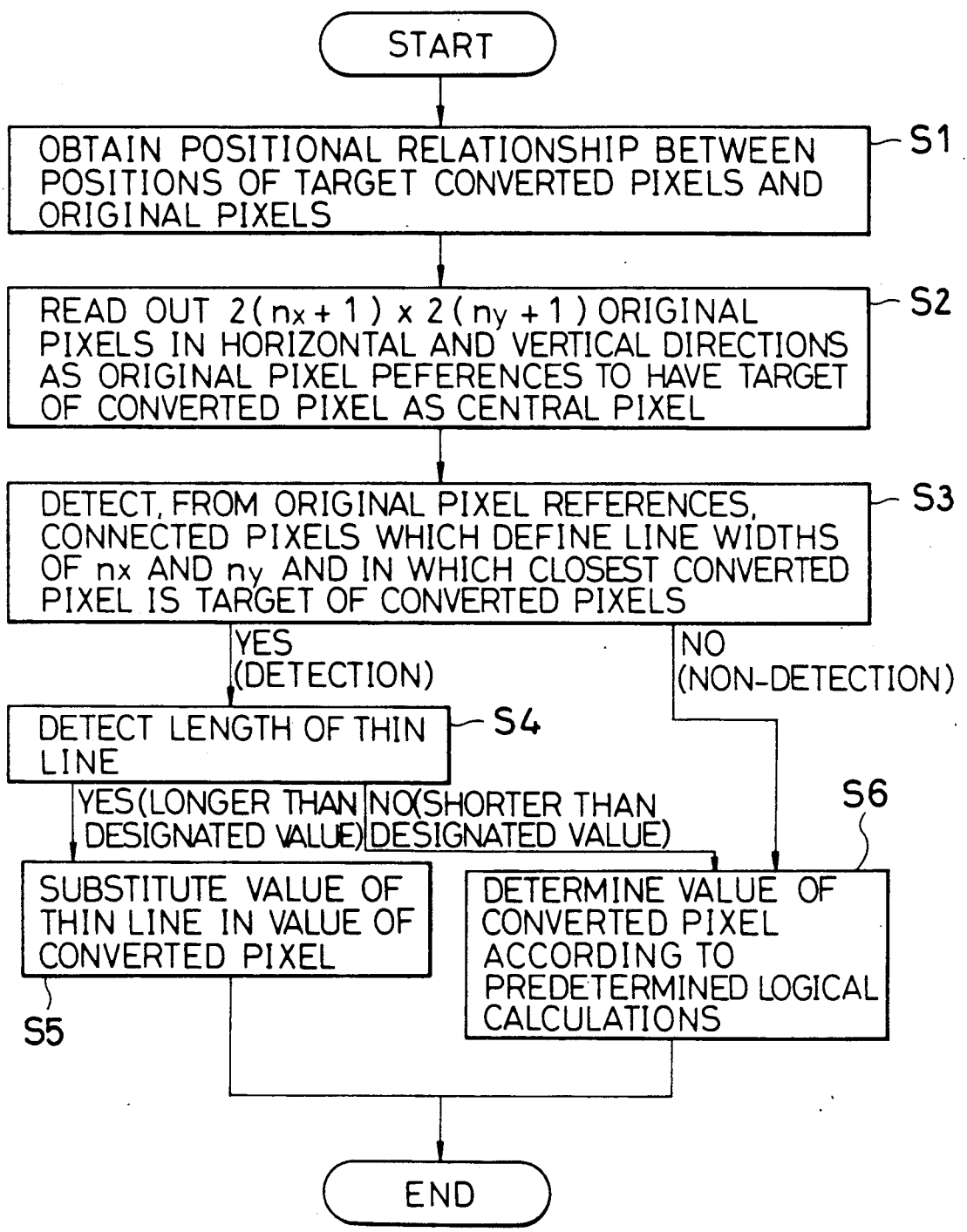
FIG. 6 is a flow chart showing binary image reduction processing according to the present invention.

FIG. 6 shows a flow of binary image reduction processing according to the present invention. In the binary image reduction processing, values of converted pixels are sequentially determined in accordance with a predetermined rule, and the determination operation is repeated to form a converted picture. The embodiment shown in FIG. 5 and the binary image reduction method of the present invention will be described below with reference to the flow chart of FIG. 6.

When horizontal and vertical conversion ratios are different, conversion can be separately performed for the horizontal and vertical directions. Therefore, the following description will be made assuming that the horizontal and vertical conversion ratios are equal to each other, and a conversion ratio $\alpha$ satisfies:

$1/n > \alpha \geq 1/(n+1)$ (where n is a natural number)

An original picture is read out by the original picture reading means 1, and a converted picture is mapped to the original picture by the converted pixel position calculating means 2, thus the position of a target of converted pixels on the original picture is obtained (S1 in FIG. 6).

Some or all of a total of $4(n+1)^2$ ($2(n+1)$ in the horizontal direction $\times 2(n+1)$ in the vertical direction) original pixels are read out as original pixel reference by the original pixel reference reading means 3 (S2 in FIG. 6).

The value of the natural number n when the $4(n+1)_2$ original pixels are read out takes the following values depending on the conversion ratio $\alpha$. That is, When $1/1 > \alpha \geq \frac{1}{2}$, n=1
When $\frac{1}{2} > \alpha \geq \frac{1}{3}$, n=2
When $\frac{1}{3} > \alpha \geq \frac{1}{4}$, n=3

Figure 7:
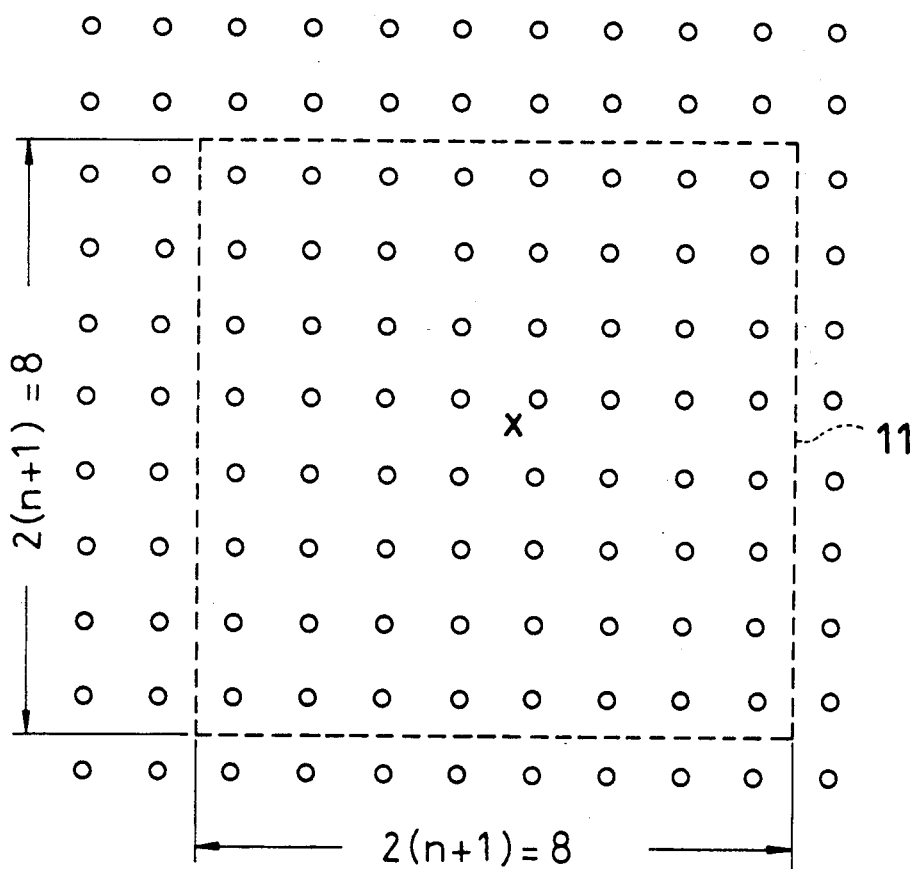
FIG. 7 shows an example of original pixels to be referred by the method of the present invention.
Figure 10A:
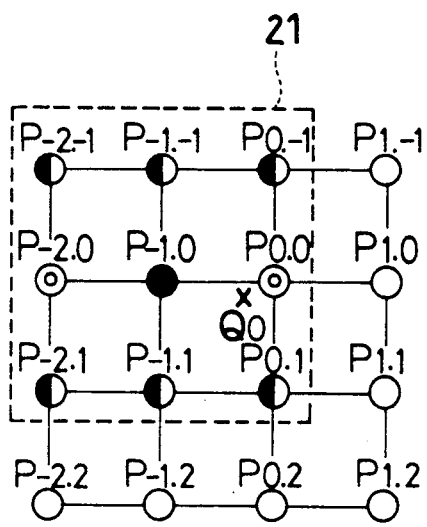
Figure 10B:
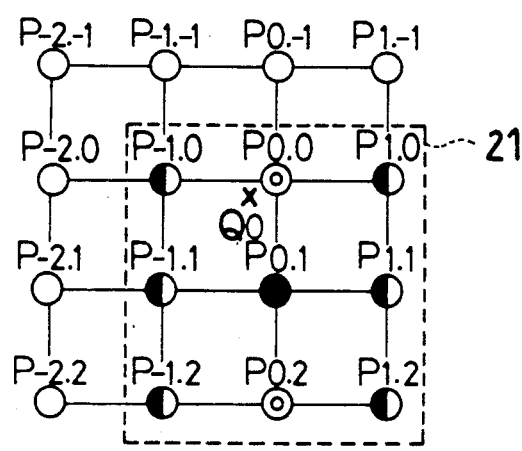
Figure 10C:
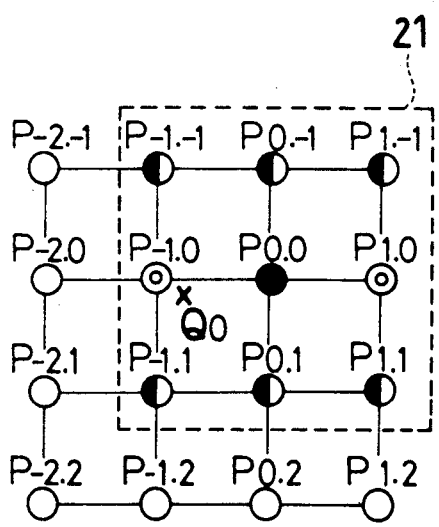
Figure 10D:
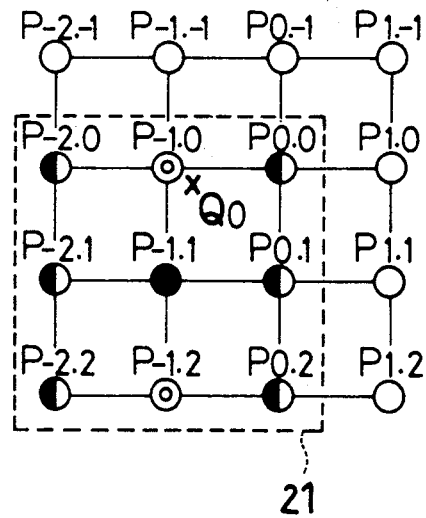
Figure 10E:
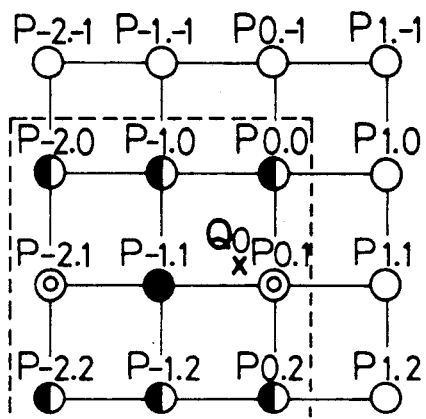
Figure 10F:
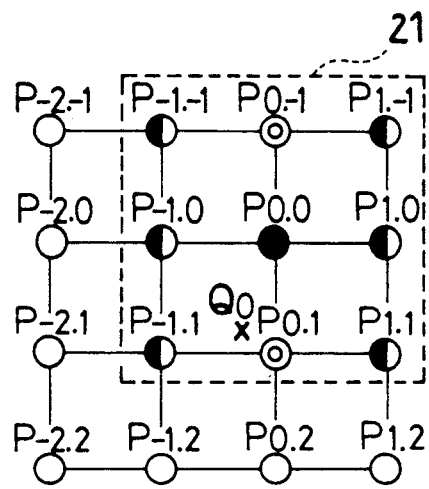
Figure 10G:
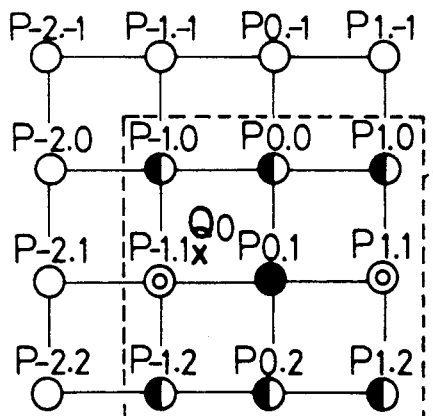
Figure 10H:
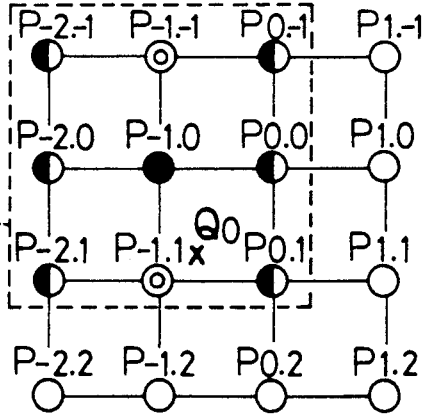
Figure 11A:
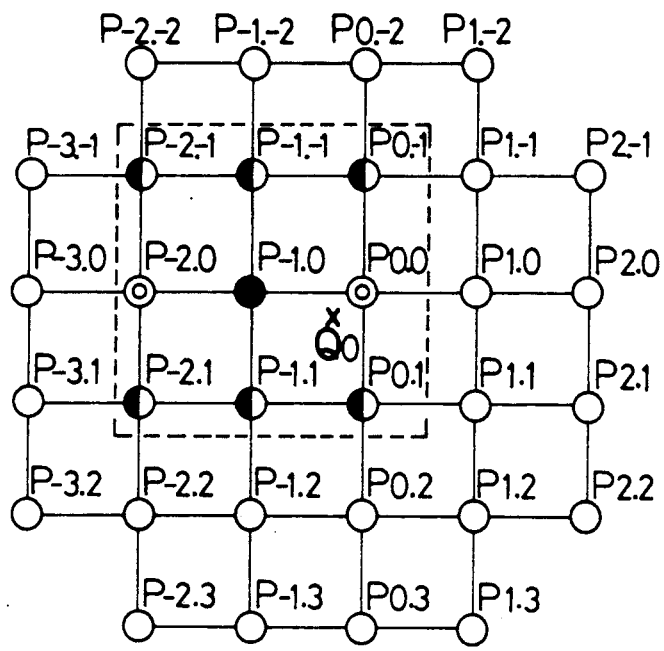
FIGS. 11(a) to 11(f) show detection positions of orthogonal/oblique thin lines having line widths of one and two pixels and a line length of three pixels when a conversion ratio $\alpha$ satisfies $\frac{1}{2} > \alpha \geq \frac{1}{3}$.
Figure 11B:
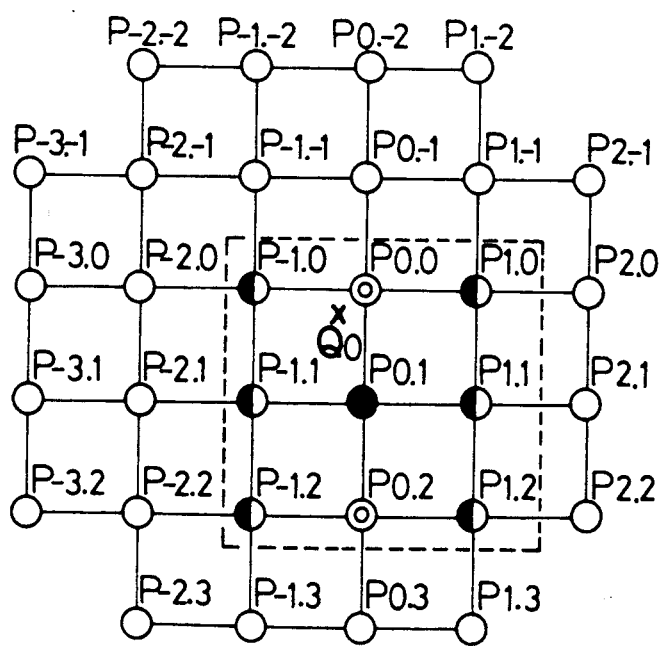
Figure 11C:
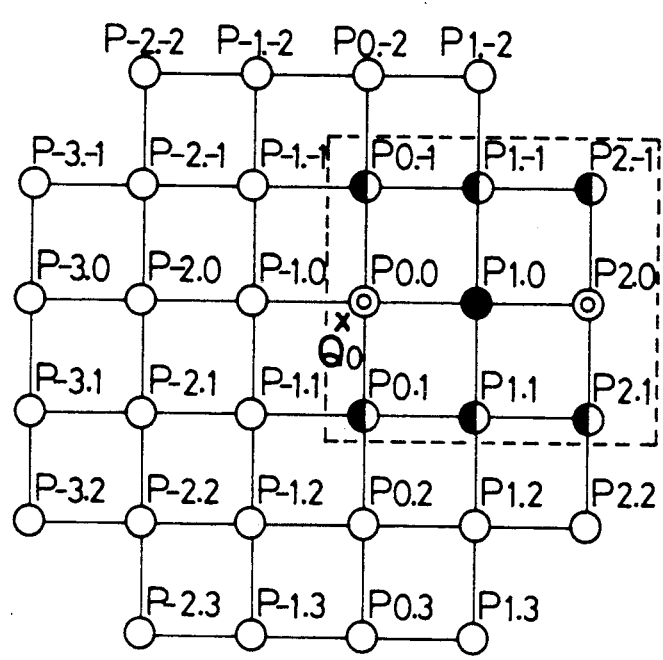
Figure 11D:
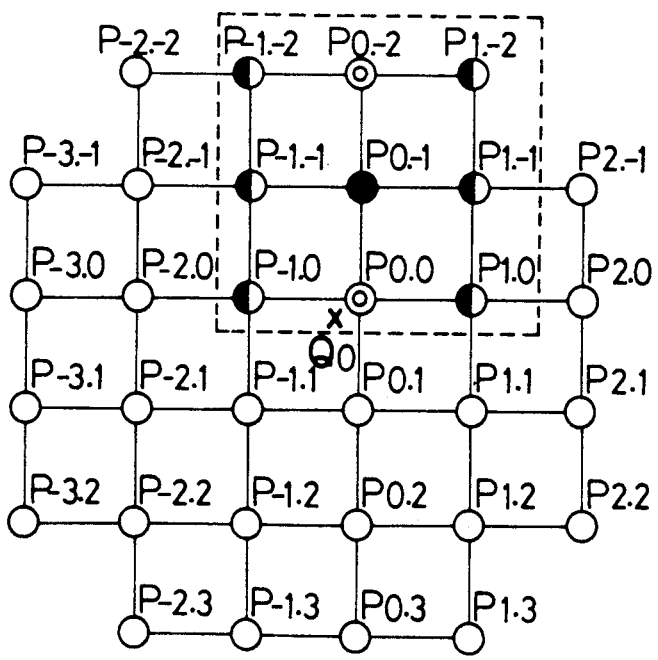
Figure 11E:
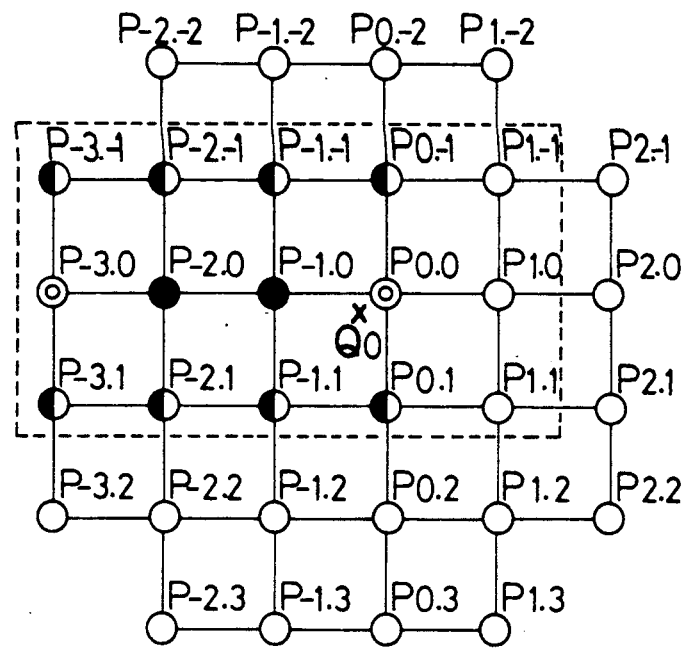
Figure 11F:
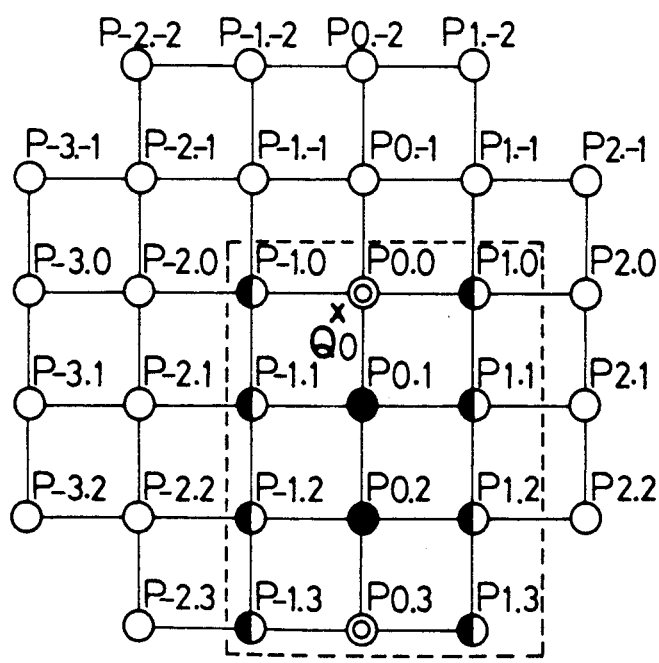

FIG. 7 exemplifies a case wherein the conversion ratio $\alpha$ satisfies $\frac{1}{3} > \alpha \geq \frac{1}{4}$. In FIG. 7, original pixels to be referred are enclosed in a dotted line 11. Each mark "o" indicates an original pixel, and a mark "x" indicates the position of a target of converted pixels. In this case, since n=3, 64 (=$2(n+1) \times 2(n+1) = 8 \times 8$) original pixels are referred. In a detailed reference method, the position of the target of converted pixels on an original picture is detected, and $2(n+1)$ (horizontal direction) $\times 2(n+1)$ (vertical direction) original pixels are sequentially read out from the contents of a line memory, having a capacity of $2(n+1)$ lines, for storing an original picture to have the target of converted pixel as a central pixel.

The means 4 for detecting thin lines and calculating a value of a converted pixel detects detects connected pixels which are vertical/oblique connected pixels having a horizontal width of $n_x$ pixels or less, and/or are horizontal/oblique connected pixels having a vertical width of $n_y$ pixels or less, and the closest converted pixel of which is the target of converted pixels (S3 in FIG. 6).

When the connected pixels, the closest converted pixel of which is the target of converted pixels, are detected, the thin line length determination means 5 determines whether or not the connected pixels have a predetermined length (S4 in FIG. 6).

FIGS. 8($a_1$) to 8($b_4$) show a detailed execution method of thin line detection of the present invention. FIGS. 8($a_1$) to 8($b_4$) exemplify vertical and horizontal thin lines having line widths of one and two original pixels and a length of three pixels when the conversion ratio $\alpha = \frac{1}{3}$. FIG. 8($a_1$) shows an area which defines thin lines detection of a line width of one pixel, and FIG. 8($a_2$) shows an area which defines thin lines detection of a line width of two pixels. FIG. 8($b1$) shows a thin line detection condition (to be referred to as a window hereinafter) for detecting a vertical line width of one pixel, FIG. 8($b_2$) shows a window for detecting a vertical line width of two pixels, FIG. 8($b_3$) shows a window for detecting a horizontal line width of one pixel, and FIG. 8($b_4$) shows a window for detecting a horizontal line width of two pixels.

Thin lines are detected using the windows shown in FIGS. 8($b1$) to 8($b_4$) by sequentially detecting the presence/absence of thin lines in all the areas of an original pixel reference shown in FIG. 8($a_1$) or 8($a_2$).

A detection condition of the window of a vertical line width of one pixel in FIG. 8($b1$) is given by:

$$(R_{-1,0}) = (R_{1,0}) = (R_{0,0})$$
$$= (R_{0,-1})$$
$$= (R_{0,1})$$

A detection condition of the window of a vertical line width of two pixels in FIG. 8($b_2$) is given by:

$$(R_{-1,0}) = (R_{2,0}) = (R_{0,0}) = (R_{1,0})$$
$$= (R_{0,-1} + R_{1,-1})$$
$$= (R_{0,1} + R_{1,1})$$

where a symbol "+" indicates a logic sum (OR).

A detection condition of the window of a horizontal line width of one pixel in FIG. 8($b_3$) is given by:

$$(R_{0,-1}) = (R_{0,1}) = (R_{0,0})$$
$$= (R_{-1,0})$$
$$= (R_{1,0})$$

A detection condition of the window of a horizontal line width of two pixels in FIG. 8($b_4$) is given by:

$$(R_{0,-1}) = (R_{0,2}) = (R_{0,0}) = (R_{0,1})$$
$$= (R_{-1,0} + R_{-1,1})$$
$$= (R_{1,0} + R_{1,1})$$

FIGS. 8($a_1$) to 8($b_4$) show some examples of thin line detection. Windows used in thin line detection may have various formats depending on the line widths and lengths of thin lines and on a case of detection of only orthogonal thin lines or of detection of both orthogonal and oblique thin lines.

9($a_1$) to 9($d_3$) show effective windows for detecting thin lines in practical use. If it is expressed that a thin line having a line width of m pixels is present when m (m is a natural number) original pixels having the same value are connected and original pixels adjacent to two ends of the m original pixels have a value different from those of the m original pixels, FIGS. 9($a_1$), 9($a_2$), and 9($a_3$) show windows for determining the presence of a thin line when a thin line having a line width of m pixels (where m=1, 2, or 3) is present and the thin line of the m pixels has a length of two pixels or more in vertical and horizontal directions; FIGS. 9($b1$), 9($b_2$), and 9($b_3$) show windows for determining the presence of a thin line when a thin line having a line width of m pixels is present and the thin line of the m pixels has a length of two pixels or more in vertical, horizontal, and oblique directions; FIGS. 9($c_1$), 9($c_2$), and 9($c_3$) show windows for determining the presence of a thin line when a thin line having a line width of m pixels is present and the thin line of the m pixels has a length of three pixels or more in vertical and horizontal directions; and FIGS. 9($d_1$), 9($d_2$), and 9($d_3$) show windows for determining the presence of a thin line when a thin line having a line width of m pixels is present and the thin line of the m pixels has a length of three pixels or more in vertical, horizontal, and oblique directions.

The windows shown in FIGS. 8($b_1$) and 8($b_3$) exemplify a case of FIG. 9($c_1$), and the windows shown in FIGS. 8($b_2$) and 8($b_4$) exemplify a case of FIG. 9($c_2$).

As has been described above with reference to FIGS. 8($a_1$) to 8($b_4$), original pixels in an area defined by the conversion ratio are read out to have a target of converted pixels as a central pixel to detect a thin line having a line width determined by the conversion ratio or less, and only a thin line having a length larger than a reference value is preserved. For this purpose, one of the windows shown in FIGS. 9($a_1$) to 9($d_3$) is selected in accordance with a necessary condition, and the presence/absence of a thin line satisfying the window is detected from the readout area. According to the above-mentioned method, thin lines will not be lost.

In the above-mentioned method, the entire area of an original pixel reference read out to have the target of converted pixels as the central pixel is checked to detect the presence/absence of a thin line corresponding to a window, and if a thin line is detected, it is checked if a converted pixel closest to the thin line is the target of converted pixels.

When the position of the target of converted pixels is determined, the position of thin lines detection (to be referred to as a window position hereinafter) is determined in accordance with conditions of the conversion ratio, the length and width of the thin line, and the extending direction of the thin line (i.e., the vertical, horizontal, or oblique direction). Therefore, the presence/absence of a thin line can be detected from the window position determined as described above. Note that four different window positions are present according to positional relationship among the target of converted pixels and four original pixels surrounding the target of converted pixels.

FIGS. 10($a$) to 10($h$) show window positions which are used for detecting orthogonal/oblique thin lines having a line width of one pixel and a line length of three pixels, i.e., window positions adopting the window shown in FIG. 9($d_1$) when the conversion ratio $\alpha$ satisfies $1/1 > \alpha \geq \frac{1}{2}$. In FIGS. 10($a$) to 10($h$), $Q_0$ designates a target of converted pixels; and $P_{m,n}$ (where $m = -2$ to 1 and $n = -1$ to 2), original pixels. A portion 21 surrounded by a dotted line corresponds to a window position. FIGS. 10($a$), 10($c$), 10($e$), and 10($g$) show window positions for vertical/oblique thin lines having a line width of one pixel, and FIGS. 10($b$), 10($d$), 10($f$), and 10($h$) show window positions for horizontal/oblique thin lines having a line width of one pixel.

FIGS. 10($a$) to 10($h$) exemplify four different cases, i.e., a case wherein the position of the target $Q_0$ of converted pixels is close to the original pixel $P_{0,0}$ (FIGS. 10($a$) and 10($b$)); a case wherein the position of the target $Q_0$ is close to the original pixel $P_{-1,0}$ (FIGS. 10($c$) and 10($d$)); a case wherein the position of the target $Q_0$ is close to the original pixel $P_{0,1}$ (FIGS. 10($e$) and 10($f$)); and a case wherein the position of the target $Q_0$ is close to the original pixel $P_{-1,1}$ (FIGS. 10($g$) and 10($h$)). The four different positions of the target $Q_0$ of converted pixels correspond to 90°-rotated positions.

In some cases, the target $Q_0$ of converted pixels may be present at a position separated an equal distance from two adjacent pixels of surrounding four original pixels, or it may be present at a position separated an equal distance from all the four surrounding original pixels. In these cases, the closest original pixel is determined in advance, so that the four different positions of the target of converted pixels can be obtained.

FIGS. 11($a$) to 11($f$) show window positions which are used for detecting orthogonal/oblique thin lines having line widths of one and two pixels and a line length of three pixels, i.e., window positions adopting the windows shown in FIGS. 9($d_1$) and 9($d_2$) when the conversion ratio $\alpha$ satisfies $\frac{1}{2} > \alpha \geq \frac{1}{3}$. Note that FIGS. 11($a$) to 11($f$) exemplify only a case wherein the target $Q_0$ of converted pixels is closest to the original pixel $P_{0,0}$. Of course, the target $Q_0$ takes four different positions like in FIGS. 10($a$) to 10($f$). FIGS. 11($a$) and 11($c$) show window positions for vertical/oblique thin lines having a line width of one pixel; FIGS. 11($b$) and 11($d$) show window positions for horizontal/oblique thin lines having a line width of one pixel; FIG. 11($e$) shows a window position for vertical/oblique thin lines having a line width of two pixels; and FIG. 11($f$) shows a window position for horizontal/oblique thin lines having a line width of two pixels.

Figure 12A:
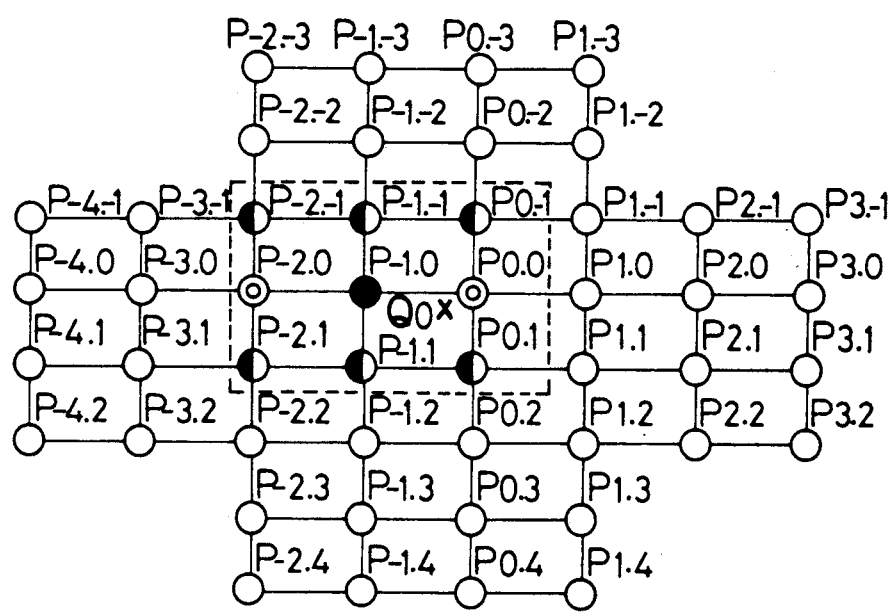
Figure 12B:
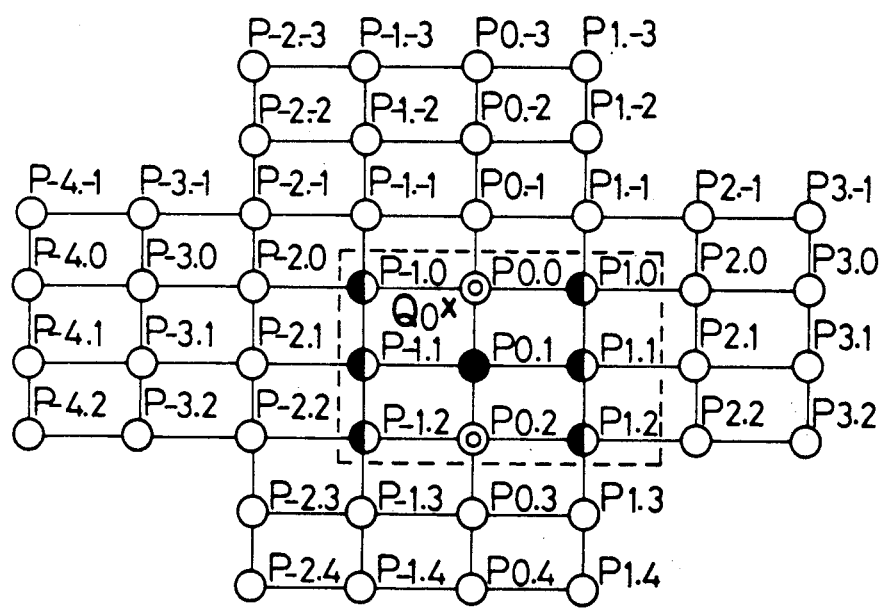
Figure 12C:
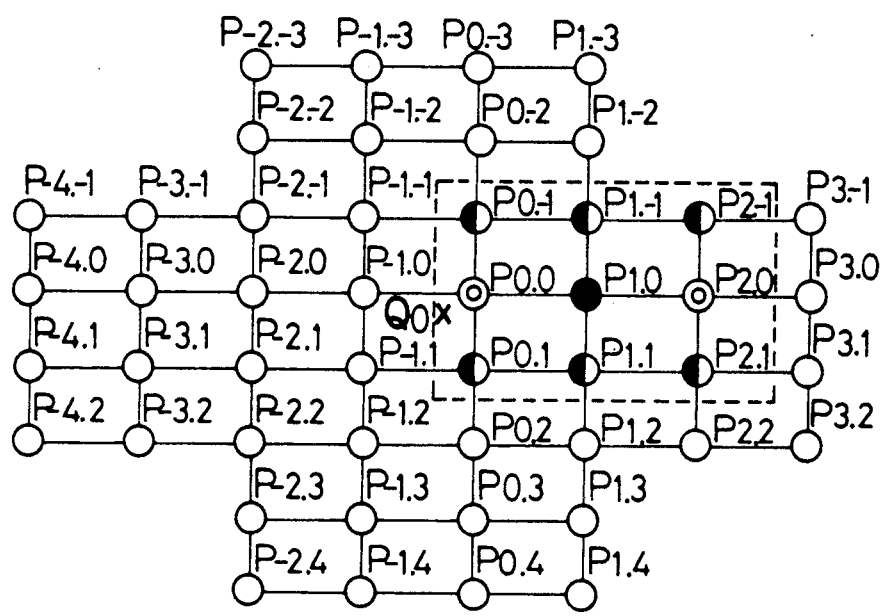
Figure 12D:
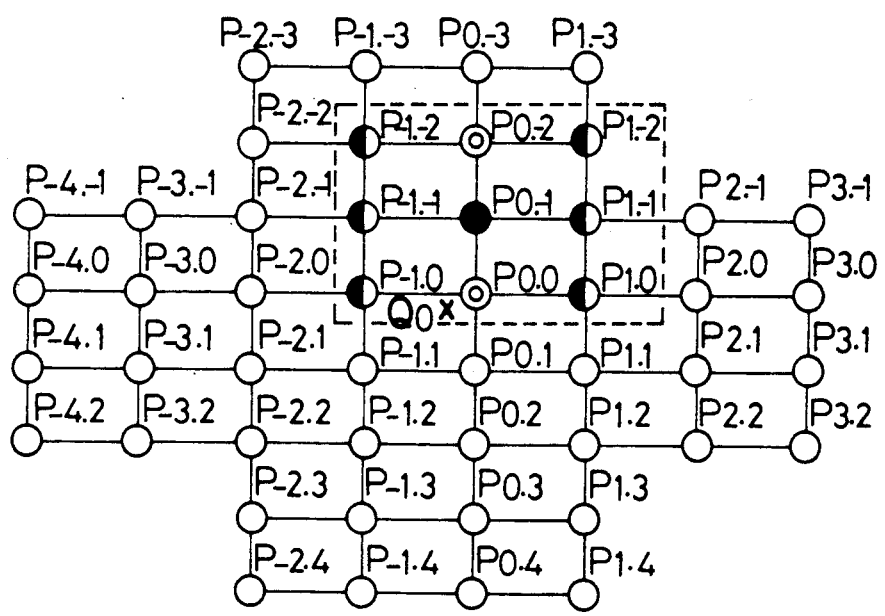
Figure 12E:
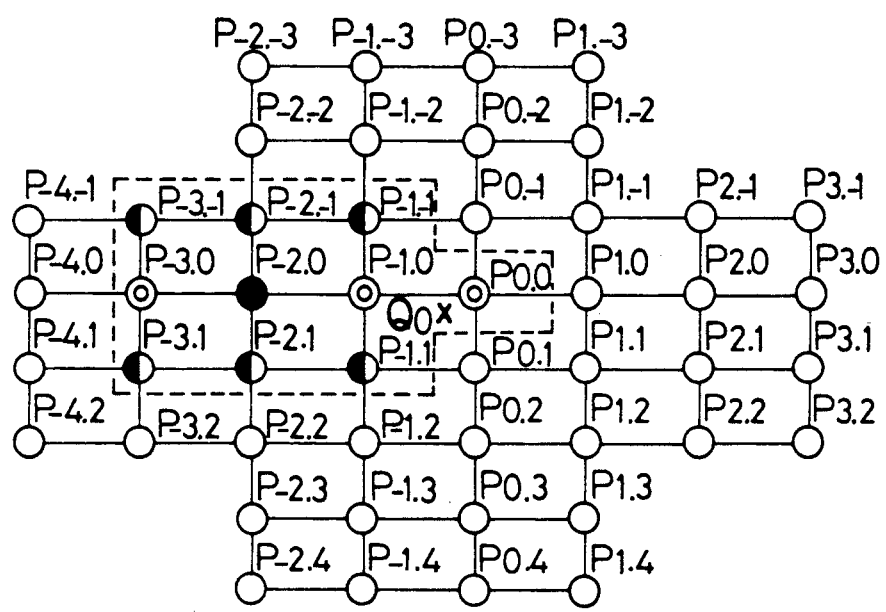
Figure 12F:
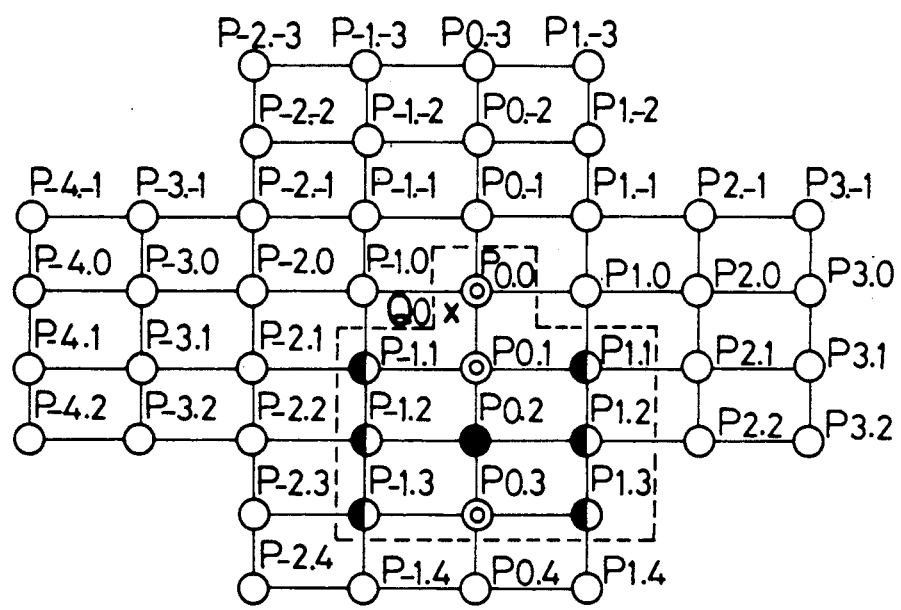
Figure 12G:
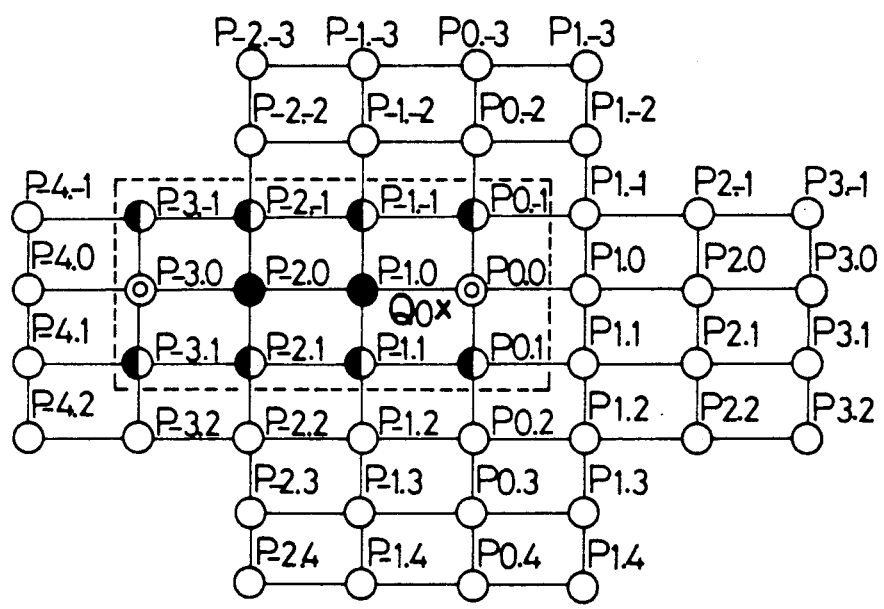
Figure 12H:
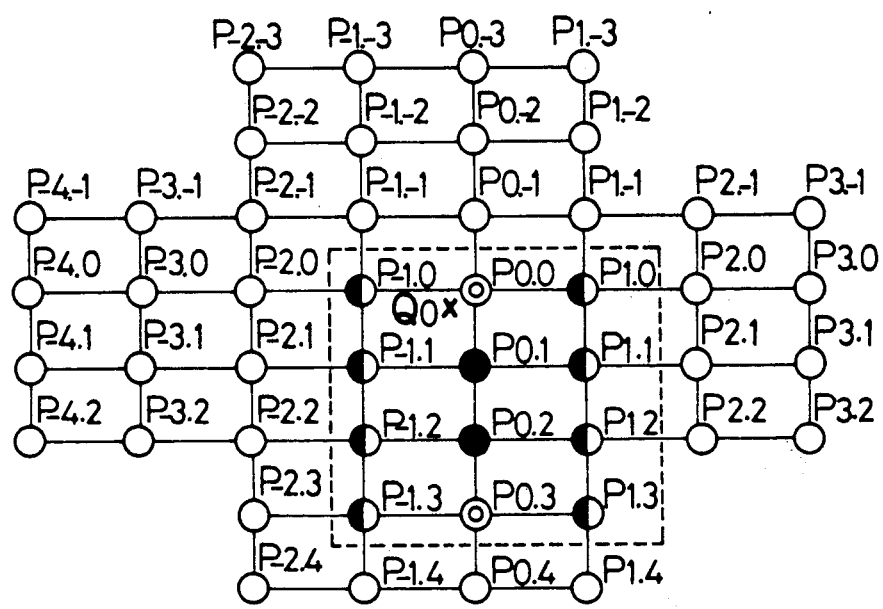
Figure 12:
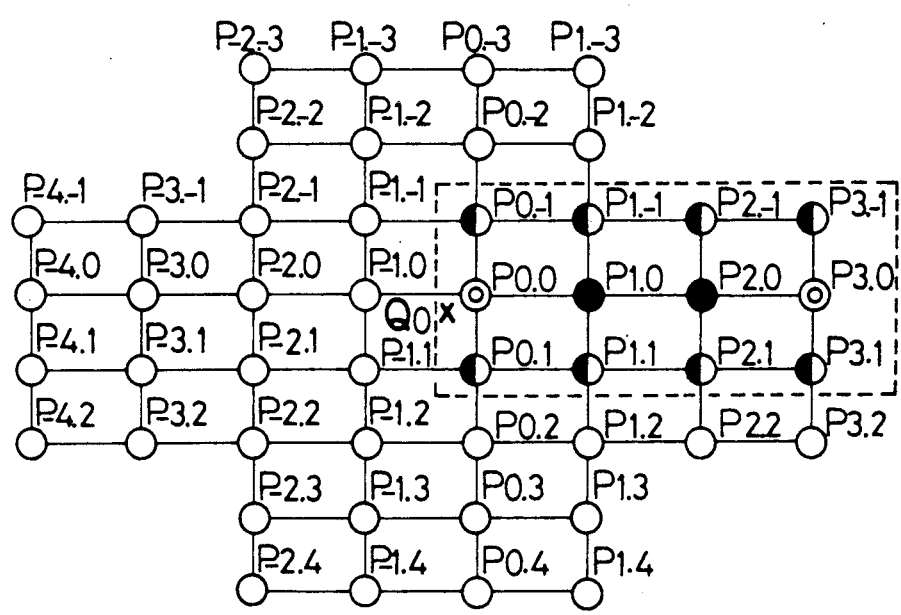
Figure 12J:
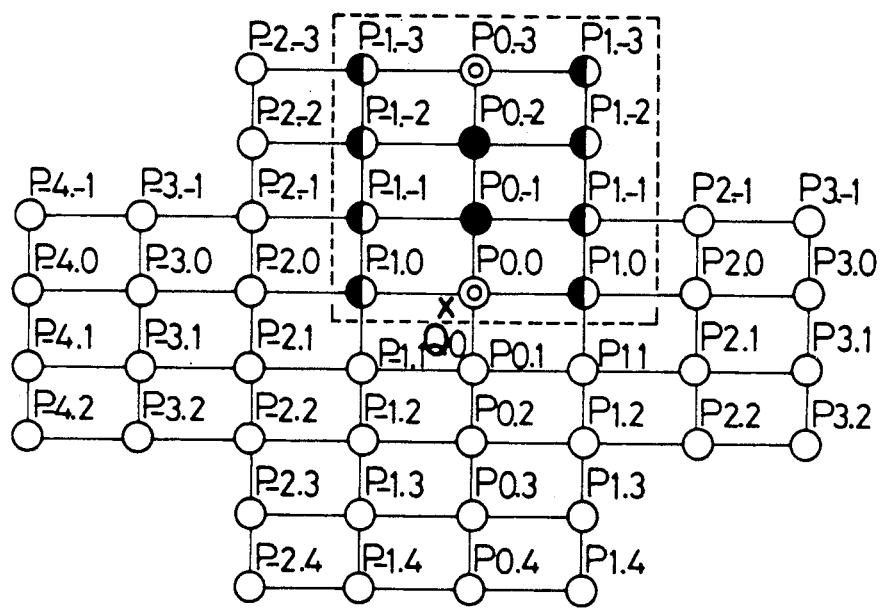
Figure 12K:
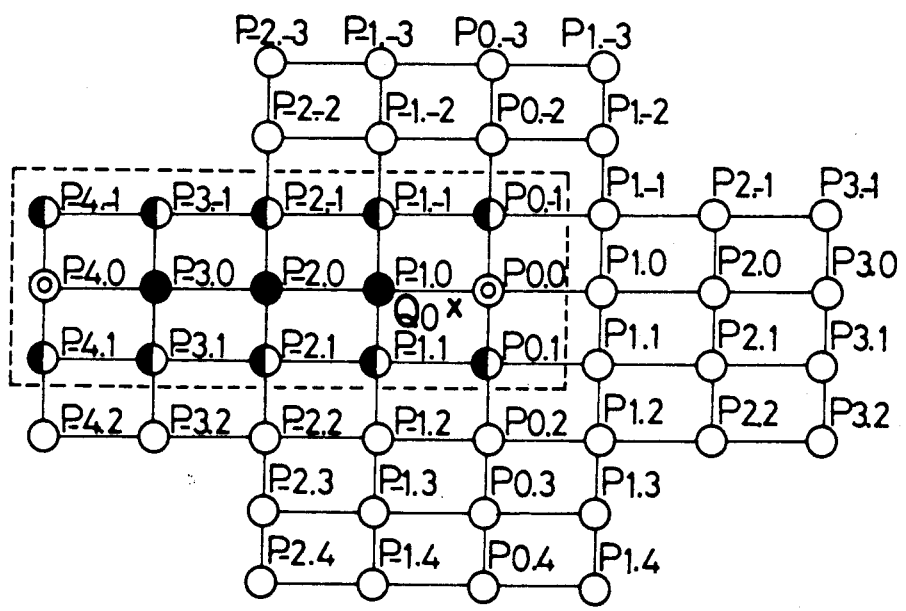

FIGS. 12($a$) to 12($l$) show window positions which are used for detecting orthogonal/oblique thin lines having line widths of one, two, and three pixels and a line length of three pixels, i.e., window positions adopting the windows shown in FIGS. 9($d_1$), 9($d_2$), and 9($d_3$) when the conversion ratio $\alpha$ satisfies $\frac{1}{3} > \alpha \geq \frac{1}{4}$. Note that FIGS. 12($a$) to 12($l$) exemplify only a case wherein the target $Q_0$ of converted pixels is closest to the original pixel $P_{0,0}$ in the same way as FIGS. 11($a$) to 11($f$). Of course, the target $Q_0$ takes four different positions as in FIGS. 10($a$) to 10($f$). FIGS. 12($a$), 12($c$), and 12($e$) show window positions for vertical/oblique thin lines having a line width of one pixel; FIGS. 12($b$), 12($d$), and 12($f$) show window positions for horizontal/oblique thin lines having a line width of one pixel;

FIGS. 12($g$) and 12($i$) show window positions for vertical/oblique thin lines having a line width of two pixels; FIGS. 12($h$) and 12($j$) show window positions for horizontal/oblique thin lines having a line width of two pixels; FIG. 12($k$) shows a window position for vertical/oblique thin lines having a line width of three pixels; and FIG. 12($l$) shows a window position for horizontal/oblique thin lines having a line width of three pixels.

All the examples of window positions shown in FIGS. 10($a$) to 12($l$) are used for a case wherein the thin line has a length of three pixels. The window position for a thin line having a length of two pixels can be determined in the same manner as described above. The windows for thin lines having a length of two pixels adopt those shown in FIGS. 9($a_1$), 9($a_2$), 9($a_3$), 9($b_1$), 9($b_2$), and 9($b_3$)

When a thin line having a predetermined length is detected by the thin line length determination means 5 shown in FIG. 5, the means 6 for substituting the value of the thin line in a converted pixel substitutes the value of the thin line in the value of the target of converted pixels (S5 in FIG. 6).

When no thin line is detected or when a converted pixel closest to the thin line is not the target of converted pixels even if a thin line is detected, and when the detected thin line does not have a predetermined length, the means 7 for calculating the value of the converted pixel shown in FIG. 5 calculates the value of the converted pixel (e.g., a value of the closest original pixel) in accordance with predetermined logical calculations, and substitutes the calculated value in the target of converted pixels.

In this embodiment, a method of detecting that the target of converted pixels is closer to a thin line than other converted pixels can be realized in such a manner that the central line of the detected thin line is calculated, distances from the central line to nearby converted pixels are compared to detect the closest converted pixel, and it is checked if the closest pixel is the target of converted pixels. In another method, if a distance between original pixels is given by 1, a distance between converted pixels is given by $1/\alpha$ if the conversion ratio is $\alpha$. The center between two converted pixels is separated from both the converted pixels by $\frac{1}{2}\alpha$. Therefore, when it can be detected if the central line of a thin line is included in an area separated from the target of converted pixels by a distance $\frac{1}{2}\alpha$ in the left, right, upper, and lower directions, it can be checked if the a converted pixel closest to the thin line is the target of converted pixels.

In this embodiment, all the $2(n+1)$ (horizontal direction) $\times 2(n+1)$ (vertical direction) original pixels are read out, and a thin line is detected using some or all of the readout original pixels, thereby forming a converted picture. However, a converted picture may be formed by a method of reading out only original pixels necessary for thin line detection.

In the above description, the cases have been described wherein thin lines having a length of two pixels or more are detected and wherein thin lines having a length of three pixels or more are detected. Upon comparison of these cases, the following features are found.

Assume that the case wherein thin lines having a length of two or more pixels are detected will be called a method (1) hereinafter, and the case wherein thin lines having a length of three or more pixels are detected will be called a method (2) hereinafter.

The number of pixels necessary for thin line detection of the method (1) shown in FIGS. $9(a_1)$ to $9(b_3)$ is smaller than that of the method (2) shown in FIGS. $9(c_1)$ to $9(d_3)$ For this reason, when thin line detection of the method (1) is realized in a hardware manner, the number of hardware components can be smaller than that in the method (2); when it is realized in a software manner, the program size can be smaller than that in the method (2), resulting in a higher processing speed. However, since thin lines having a length of two or more pixels are detected, if an uneven pattern of one pixel is included in a thin line, the thin line cannot often be prevented from being disconnected. For this reason, image quality of a converted picture in the method (1) is inferior to that in the method (2).

On the other hand, the number of pixels necessary for thin line detection in the method (2) is larger than that in the method (1). For this reason, when thin line detection of the method (2) is realized in a hardware manner, the number of hardware components is larger than that in the method (1); when it is realized in a software manner, the program size is larger and a processing speed is lower. However, in the method (2), since thin lines having a length of three or more pixels are detected, even if an uneven pattern of one pixel is present in a thin line, the thin line will not be disconnected. For this reason, image quality of a converted image is superior to that in the method (1). Even if an uneven pattern of one pixel is present in a thin line, since the uneven pattern does not have a length of three or more pixels, the uneven pattern is never erroneously detected as a thin line.

The above features can provide the following advantages. That is, when the number of hardware components is to be decreased or when a higher processing speed is to be attained, the method (1) is preferably employed. When an importance is put on image quality, the method (2) is preferable. In this manner, a desired method can be selected from the two methods.

Figure 13A:
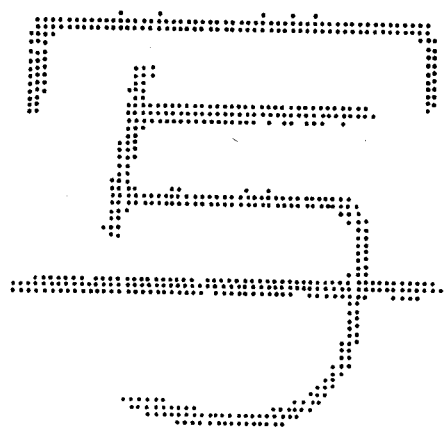
FIGS. 13(a) to 13(c) show converted pictures obtained by converting a character (Chinese character) by conventional binary image reduction methods and the binary image reduction method of the present invention.
Figures 13B, 13C:
Figure 14A:
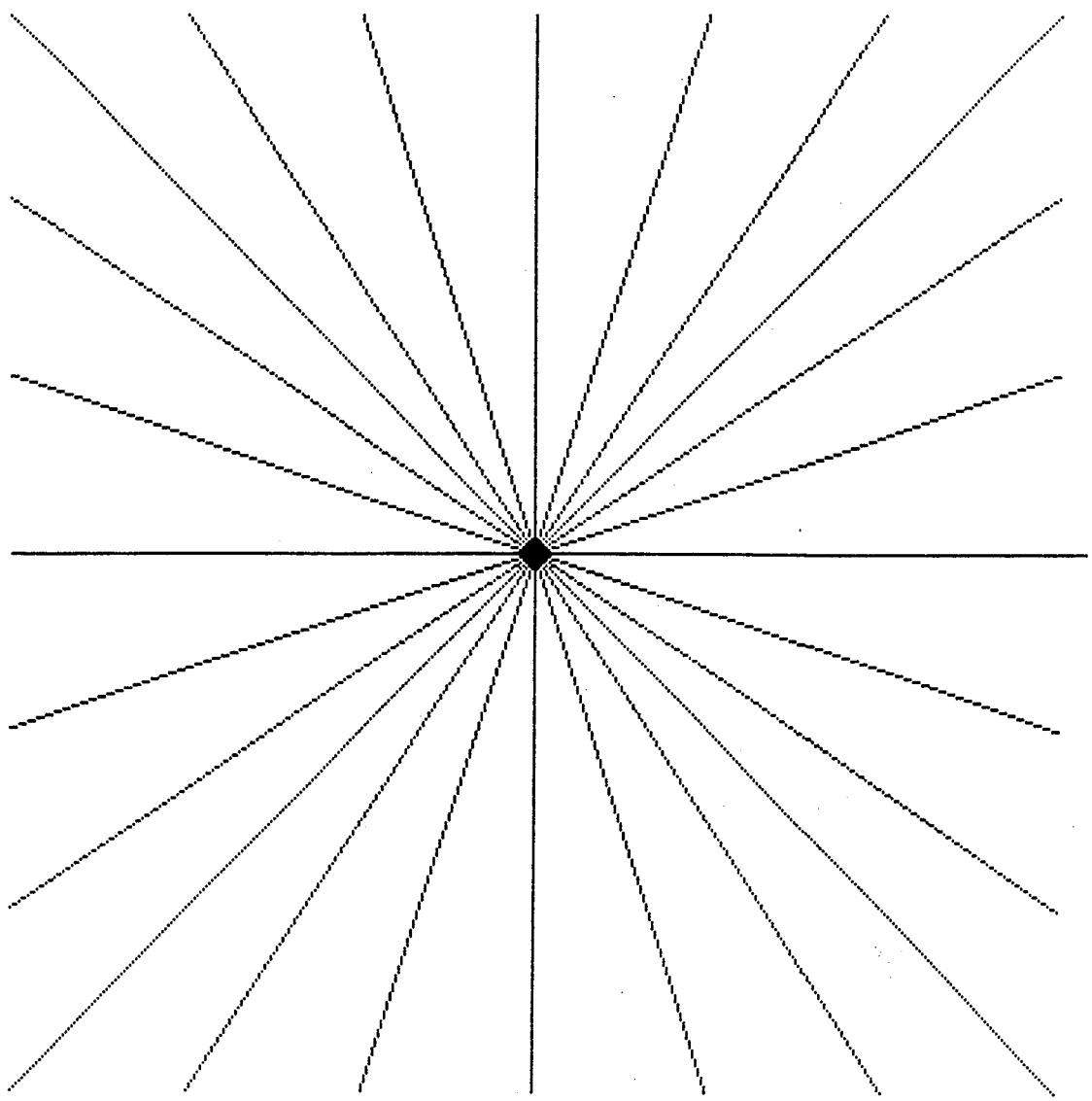
FIGS. 14(a) to 14(c) show converted pictures obtained by converting an original picture having vertical, horizontal, and oblique lines by a conventional binary image reduction method and the binary image reduction method of the present invention.
Figure 14B:
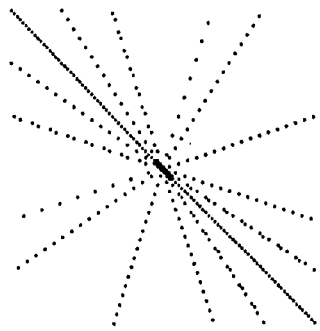
Figure 14C:
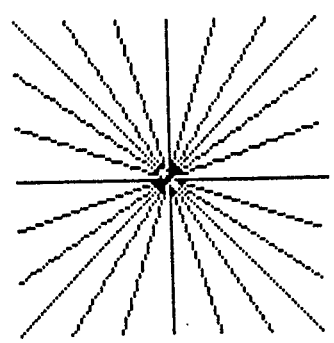

FIG. 13(b) shows characters obtained by reducing an original picture shown in FIG. 13(a) by conventional reduction methods (the SPC method and the TP method), and FIG. 13(c) shows a character obtained by converting the original picture of FIG. 13(a) by the reduction method of the present invention. FIG. 14(b) shows a pattern obtained by reducing an original picture having vertical, horizontal, and oblique lines shown in FIG. 14(a) by the conventional reduction method (the SPC method), and FIG. 14(c) shows a pattern obtained by converting the original picture of FIG. 14(a) by the reduction method of the present invention. As can be seen from these figures, binary image reduction free from loss of thin lines can be realized by the reduction method of the present invention.

What is claimed is:

1. A binary image reduction method for reducing a binary original picture at a conversion ratio $\alpha_x$ smaller than 1 in a horizontal direction and at a conversion ration $\alpha y$ smaller than 1 in a vertical direction to obtain a converted picture, x satisfying $1/n_x > \alpha_x \geq 1/(n_x+1)$
   y satisfying $1/n_y > \alpha_y > 1/(n_y+1)$
   where $n_x$ and $n_y$ are natural numbers,
   said method comprising the steps of:
   obtaining a positional relationship between a target of converted pixels of the converted picture to be produced and original pixels on the original picture;
   forming a rectangular area on the original picture having a side of $2(n_x+1)$ original pixels in the horizontal direction and a side of $2(n_y+1)$ original pixels in the vertical direction such that the position of the target of a converted pixel occupies a central position of said rectangular area;
   detecting the presence/absence of a line segment having a predetermined width and a predetermined length in said rectangular area using some or all of $4(n_x+1) \times (n_y+1)$ original pixels in the rectangular area; and
   assigning values of pixels of the line segment as the values of the targets of converted pixels when the line segment is present in the rectangular area and the targets of converted pixels are each the converted pixel closest to the detected line segment.

2. A binary image reduction method according to claim 1, wherein the step of detecting the presence/absence of the line segment includes the step of detecting that the line segment is present in the original picture
   (1) when, in the original picture, a certain pixel having a specific value has right and left adjacent pixels having a different value from said certain pixel, and pixels having the same value as said certain pixel are connected by not less than a predetermined number of pixels in a vertical or oblique direction, or
   (2) when, in the original picture, a number of horizontally connected pixels have the same value and pixels adjacent to two ends of the horizontally connected pixels have a value different from the connected pixels, the number of the horizontally connected pixels is not less than 2 and not more than $n_x$, and pixels having the same value as the horizontally connected pixels are connected by not less than a predetermined number of pixels in a horizontal or oblique direction.

3. A binary image reduction method according to claim 1, wherein the step of detecting the presence/absence of the line segment includes the step of detecting that the line segment is present in the original picture (1) when, in the original picture, a certain pixel having a specific value has upper and lower adjacent pixels having a different value from said certain pixel, and pixels having the same value as said certain pixel are connected by not less than a predetermined number of pixels in a horizontal or oblique direction, or (2) when, in the original picture, a number of vertically connected pixels have the same value and pixels adjacent to two ends of the vertically connected pixels have a value different from the connected pixels, the number of the vertically connected pixels is not less than 2 and not more than $n_y$, and pixels having the same value as the vertically connected pixels are connected by not less than a predetermined number of pixels in a horizontal or oblique direction.

4. A binary image reduction method according to claim 2, wherein said predetermined number of pixels corresponds to at least two pixels on the original picture.

* * * * *